(12) United States Patent
McGregor et al.

(10) Patent No.: US 9,483,052 B2
(45) Date of Patent: Nov. 1, 2016

(54) AIRCRAFT DEPARTURE PROFILE GENERATION COMPLIANT WITH NOISE ABATEMENT LIMITS

(71) Applicant: The Boeing Company, Chicago, IL (US)

(72) Inventors: Daniel L. McGregor, Renton, WA (US); Paul Henry Bent, Kenmore, WA (US); Douglas A. Stoll, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 14/303,323

(22) Filed: Jun. 12, 2014

(65) Prior Publication Data

US 2015/0362920 A1   Dec. 17, 2015

(51) Int. Cl.

| | |
|---|---|
| *G05D 1/02* | (2006.01) |
| *B64F 1/26* | (2006.01) |
| *G06Q 10/06* | (2012.01) |
| *G05D 1/00* | (2006.01) |
| *G01C 23/00* | (2006.01) |
| *G08G 5/00* | (2006.01) |
| *G08G 5/06* | (2006.01) |
| *G01C 5/00* | (2006.01) |
| *G05D 1/06* | (2006.01) |

(52) U.S. Cl.
CPC .............. *G05D 1/0214* (2013.01); *B64F 1/26* (2013.01); *G06Q 10/06* (2013.01); *G01C 5/00* (2013.01); *G01C 5/005* (2013.01); *G01C 23/00* (2013.01); *G05D 1/00* (2013.01); *G05D 1/0005* (2013.01); *G05D 1/0653* (2013.01); *G08G 5/0021* (2013.01); *G08G 5/0086* (2013.01); *G08G 5/065* (2013.01)

(58) Field of Classification Search
CPC ............ B64F 5/00; B64F 1/26; G06F 17/50; G06F 17/00; G08G 5/00; G08G 5/0065; G08G 5/0021; G08G 5/006; G08G 5/065; G08G 5/045; G08G 9/00; G05D 1/0202; G05D 1/00; G05D 1/0653; G05D 1/0005; G05D 1/0214; B64D 45/00; B64D 45/04; G10K 11/00; G08B 23/00; B60R 25/1025
See application file for complete search history.

(56) References Cited

U.S. PATENT DOCUMENTS

| | | | |
|---|---|---|---|
| 7,584,028 B2 | 9/2009 | Burnside | |
| 7,714,744 B1 * | 5/2010 | Wichgers | ............... G08G 5/045 340/945 |

(Continued)

OTHER PUBLICATIONS

Lan, Shan, "Planning for Robust Airline Operations: Optimizing Aircraft Routings and Flight Departure Times to Achieve Minimum Passenger Disruptions", Massachusetts Institute of Technology, Department of Civil and Environmental Engineering, Jun. 2003, 123 pages.
Ding et al., "Optimization of Airport Flight Arrival and Departure Based on Compromise Immune Algorithm", Third International Conference on Natural Computation, 2007, IEEE, 5 pages.

(Continued)

*Primary Examiner* — Behrang Badii
(74) *Attorney, Agent, or Firm* — Kolisch Hartwell, P.C.

(57) ABSTRACT

Systems and methods are described for dynamically generating flight departure profiles that are in compliance with aircraft emission limits. Emission limits may include noise abatement limits. Flight departure profiles may be generated on a flight by flight basis, and/or may be based on then-current conditions such as wind speed, wind direction, and ambient temperature.

11 Claims, 7 Drawing Sheets

(56) References Cited

U.S. PATENT DOCUMENTS

| | | | | |
|---|---|---|---|---|
| 8,193,948 | B1* | 6/2012 | Shapiro | G08G 5/065 340/945 |
| 2008/0306680 | A1* | 12/2008 | Marty | G01C 21/00 701/533 |
| 2009/0204453 | A1 | 8/2009 | Cooper et al. | |
| 2013/0085669 | A1* | 4/2013 | Bailey | G08G 5/0039 701/467 |
| 2013/0092791 | A1* | 4/2013 | Bakker | G08G 5/006 244/1 N |
| 2013/0190950 | A1* | 7/2013 | Shukla | G06F 17/00 701/3 |
| 2013/0226373 | A1* | 8/2013 | Bollapragada | G06Q 10/047 701/3 |
| 2013/0238173 | A1* | 9/2013 | Burns | G08G 5/0065 701/15 |

OTHER PUBLICATIONS

Altus, Steve, "Effective Flight Plans Can Help Airlines Economize." Boeing Aero Magazine, 2009, Quarter 3, pp. 26-30.

Mukherjee et al. "Optimizing Flight Departure Delay and Route Selection Under En Route Convective Weather", American Institute of Aeronautics and Astronautics, 2010, pp. 1-11.

Carnelly, Daniel, "Airbus Aircraft Acoustic Abatement: Initiatives to Reduce Perceived Aircraft Noise", Royal Aeronautical Society, Oct. 17, 2013, pp. 1-37.

Poussin, Gilles, "Green departure function ready for take-off", Skyline, Feb. 2014, No. 12, p. 11.

European Patent Office, Extended European Search Report regarding European Patent Application No. 15171832.7, Oct. 16, 2016, 3 pages.

\* cited by examiner

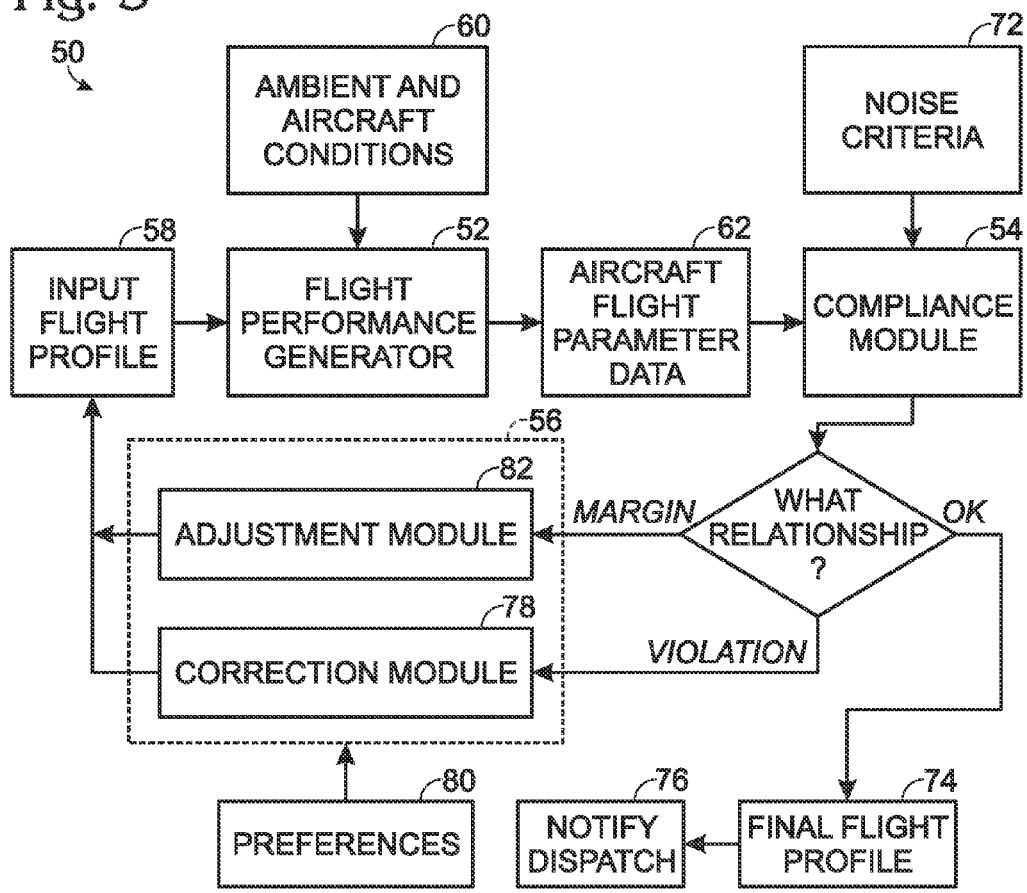

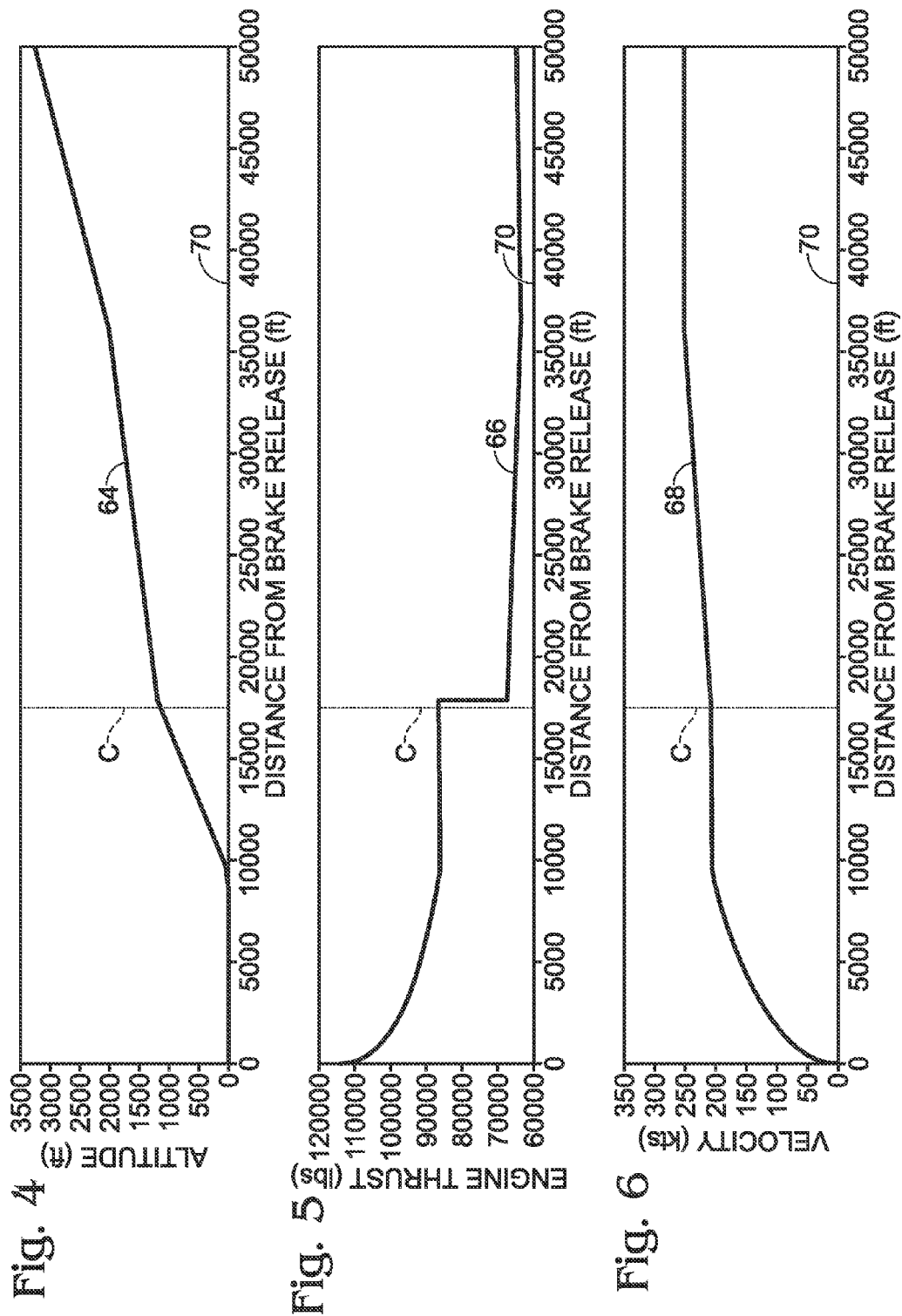

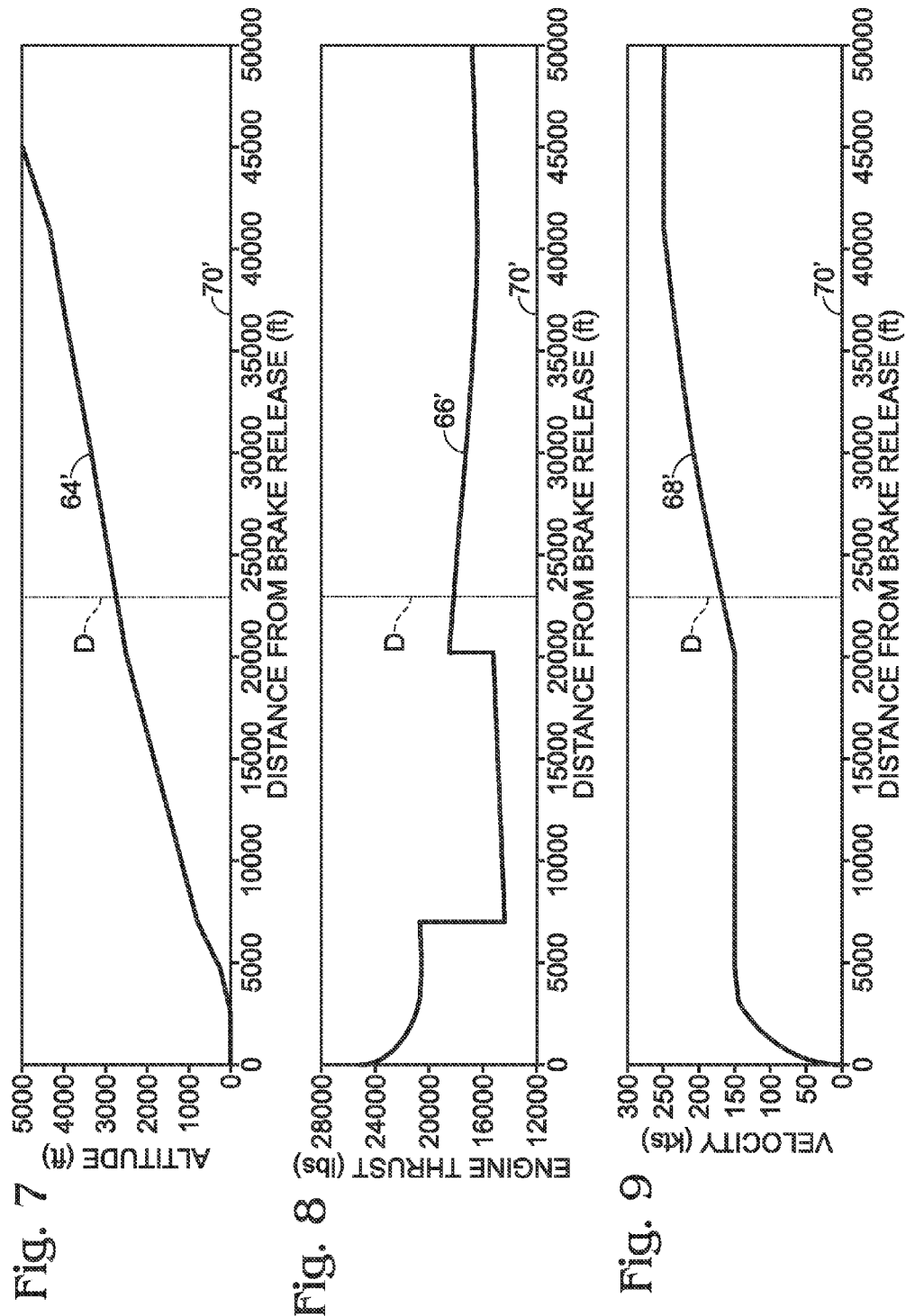

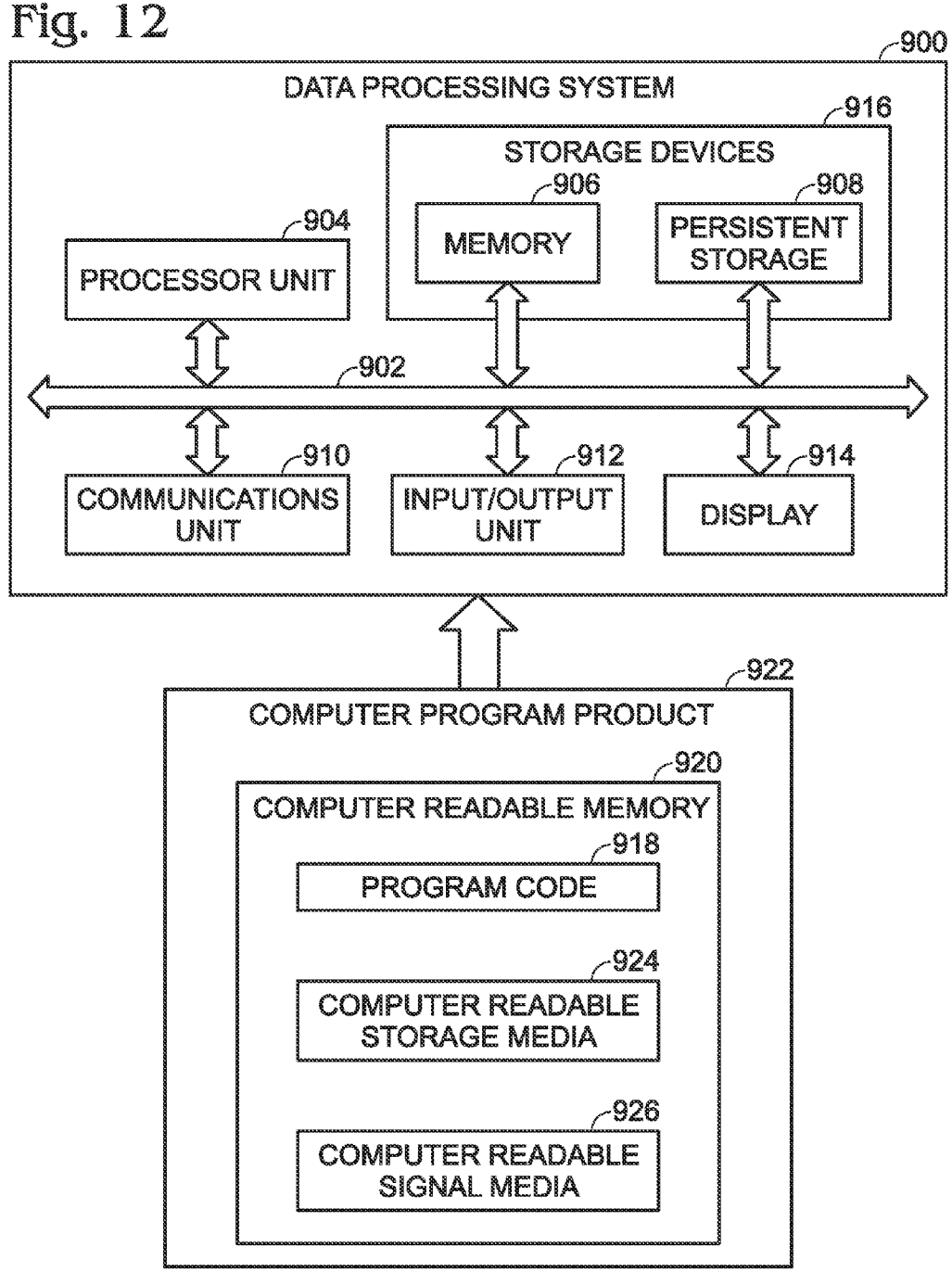

AIRCRAFT DEPARTURE PROFILE GENERATION COMPLIANT WITH NOISE ABATEMENT LIMITS

CROSS-REFERENCES

The following related applications and materials are incorporated herein, in their entireties, for all purposes: U.S. Pat. No. 7,584,028, and U.S. Patent Pub. No. 2013/0238173A1.

FIELD

This disclosure relates to aircraft departure environmental emission procedures.

More specifically, the disclosed embodiments relate to systems and methods to leverage aircraft performance and flight efficiency for noise abatement during the departure phase.

BACKGROUND

Noise generated at and near an airport is typically limited and monitored by the airport and surrounding community. Airports may limit noise for all aircraft during a certain period of time, limit noise for each takeoff (i.e., departure), or a combination of such approaches. Known systems for determining departure profiles have only focused on noise abatement, without regard to how the profile may adversely affect other aircraft operations and factors such as fuel efficiency. These departure profiles are "one-size-fits-all" for every flight, regardless of the type of aircraft, ambient conditions, payload, etc., and take into account only worst-case scenarios for thrust, climb, and speed to ensure that the aircraft departs safely and meets noise level restrictions.

Noise abatement may also be addressed by the airline-specific operations specification (Ops Spec), which is a document contained within the airline's Flight Operations Manual (FOM). Ops Specs are required by 14 CFR §119.49 for each certificate holder conducting domestic, flag, or commuter operations. The Ops Spec contains guidance on topics such as Authority to Operate, Prohibited Operations, Takeoff, Approach and Landing, En Route, Airports, and Maintenance. The Ops Spec provides guidance and instructions to the pilot for takeoff operations. Many airports also publish their own noise abatement takeoff guidance.

SUMMARY

Some embodiments of the present disclosure provide a system comprising a flight performance data generator configured to receive current condition inputs and a desired departure profile, the flight performance data generator further configured to calculate departure performance data for an aircraft based on the desired departure profile and the current condition inputs; and a comparison module configured to receive one or more external criteria, to compare the one or more external criteria to at least one value corresponding to the calculated departure performance data, and to provide a comparison output indicating a result of the comparison.

In some embodiments, a computer system for generating a departure profile for an aircraft may include a processor; a memory; and a departure profile generating program including a plurality of instructions stored in the memory that are executed by the processor to: receive current condition inputs and a first departure profile; calculate first departure performance data for an aircraft based on the current condition inputs and the first departure profile; determine a first relationship between one or more external criteria and the first departure performance data; and provide an output corresponding to the first relationship.

In some embodiments, a method for generating a flight departure profile that is compliant with an emission limit at a monitoring location may include receiving a desired flight departure profile and one or more current ambient conditions; generating flight performance data describing a flight path of a selected aircraft following the desired flight departure profile under the current ambient conditions; determining an expected environmental emission of the aircraft as sensed at a selected monitoring location; comparing the expected environmental emission of the aircraft to an emission abatement limit to determine a relationship therebetween; and communicating the relationship.

The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a block diagram illustrating operations performed by one embodiment of a system for generating aircraft departure profiles in accordance with aspects of the present disclosure.

FIG. 4 is a graph showing altitude vs. distance for an illustrative aircraft departure.

FIG. 5 is a graph showing thrust vs. distance for the illustrative departure of FIG. 4.

FIG. 6 is a graph showing velocity vs. distance for the illustrative departure of FIG. 4.

FIG. 7 is a graph showing altitude vs. distance for another illustrative aircraft departure.

FIG. 8 is a graph showing thrust vs. distance for the illustrative departure of FIG. 7.

FIG. 9 is a graph showing velocity vs. distance for the illustrative departure of FIG. 7.

FIG. 12 is a schematic diagram of an illustrative data processing system suitable for use in a departure profile generating system in accordance with aspects of the present disclosure.

DESCRIPTION

Overview

Various embodiments of systems and methods for generating aircraft departure profiles that are compliant with environmental emission criteria are described below and illustrated in the associated drawings. Unless otherwise specified, a profile generator and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other systems and methods for generating aircraft-related information. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Systems and methods will now be described with respect to a dynamic, ground-based system for computing low-noise, efficient flight departure profiles on a flight-by-flight basis using then-current conditions.

Figure 1:
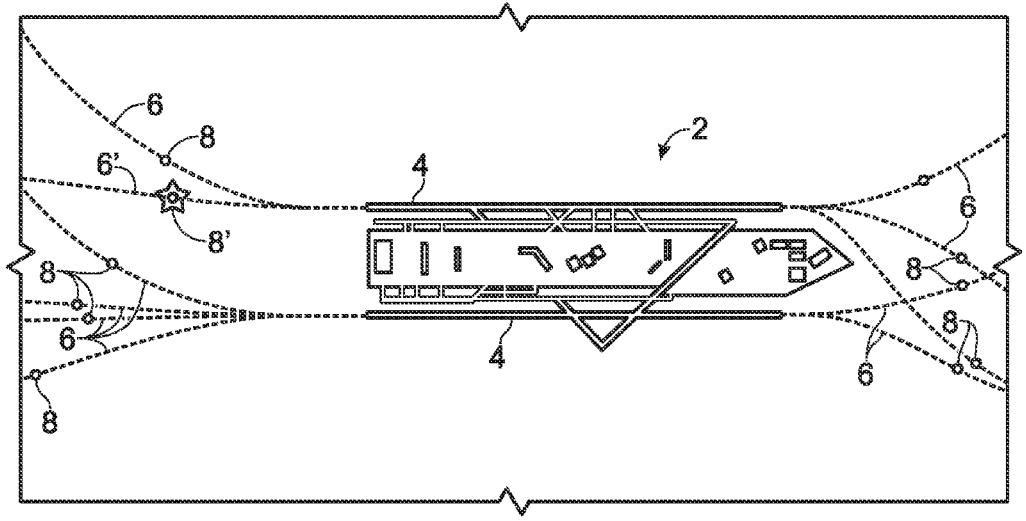
FIG. 1 is an overhead view of an illustrative airport, showing a plurality of illustrative runways, aircraft departure tracks, and noise monitoring stations.

Commercial airports, such as the illustrative airport shown in FIG. 1 and generally indicated at 2, typically include one or more runways 4, each of which may include one or more defined departure tracks 6. Each track 6 indicates a prescribed path over the ground that a given aircraft will fly, as defined by certain landmarks and/or bearing angles. However, departure tracks do not typically include information regarding other dimensions of an aircraft departure, such as altitude, thrust, and velocity of a given aircraft along the track. These other dimensions are typically determined by a departure profile, which may include information such as thrust reduction altitude, engine climb power settings, etc. Accordingly, each track 6 may be followed by an aircraft adhering to any suitable departure profile.

Referring again to FIG. 1, emission monitoring stations, such as noise monitoring stations 8, are typically disposed along one or more of the departure tracks (or in a suitably adjacent location) for monitoring emissions of aircraft following the respective tracks. For example, an aircraft departing along track 6' may be monitored by noise monitoring station 8'. Violation of established noise abatement limits may be reported to the appropriate authorities. Fines for violation of such limits, typically levied against the corresponding airline, can be quite high. Accordingly, for this and for other reasons, it is desirable to avoid violation of noise abatement limits. At the same time, excessive compliance, in which the aircraft meets the limits by a wide margin, may also be undesirable because it is both costly and unnecessary.

In general, a departure profile generator in accordance with aspects of the present disclosure may include a flight performance data generator module that receives as inputs a desired flight profile and current conditions such as weather, runway condition, and aircraft configuration. Based on the desired profile and the conditions, the module generates flight performance data (also referred to as parameters) for the aircraft such as altitude, velocity, and thrust vs. distance. This data may be received by a simulation and compliance module that determines environmental emissions (e.g., noise, carbon, greenhouse gases, etc.) from the aircraft that can be expected at known monitoring stations based on the flight performance data. The emissions are then compared to criteria such as abatement limits, and one or more relationships between the emissions and the criteria are determined. The relationship is then communicated, such as to the user, so that the desired flight profile may be modified to change the relationship. For example, if noise emissions exceed allowable noise abatement limits, the desired profile can be modified to reduce noise.

Aspects of the present disclosure may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "circuit," "module," "unit," or "system." Furthermore, aspects of the present disclosure may take the form of a computer program product embodied in a computer-readable medium (or media) having computer readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present invention may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present invention are described below with reference to flowchart illustrations and/or block diagrams of methods, apparatuses, systems, and/or computer program products according to aspects of the present disclosure. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Systems and methods in accordance with aspects of the present disclosure can be used by dispatchers at airlines to determine optimum takeoff or departure profiles for each flight. These systems and methods may be used by airports for planning purposes, such as when determining impact of changes to airport infrastructure or regulations. In some embodiments, the system is configured to tailor a departure profile for a certain aircraft at a certain airport under current conditions. As such, the system can reduce fuel consumption while still meeting noise and other restrictions (e.g., runway length, obstacles past the runway, etc.).

A user such as a dispatcher or airline employee may input current conditions and a desired departure profile into the system. The desired departure profile is determined by an airline to achieve one or more airline goals (e.g., reduced fuel consumption, reduced emissions, reduced thrust, faster takeoff speed, and/or higher altitude sooner in the departure). Current conditions may include information specific to the aircraft and payload, ambient weather conditions, and information specific to the airport. These current conditions may be input into fields on a graphical user interface.

In some embodiments, the system may use the desired departure profile and current conditions to calculate departure parameters of an optimized departure profile. This departure profile may be the same as the desired departure profile. The departure profile is compared with external criteria, such as noise level limits at various locations. When the external criteria are met (possibly as defined by the user), the optimized departure profile is output as a final departure profile.

In some embodiments, when external criteria are not met, the system calculates an adjusted departure profile that is as close as possible to the desired departure profile. The adjusted departure profile is then compared to compliance criteria. When the adjusted departure profile is compliant, its parameters are tested against the external criteria. When the external criteria are met, the adjusted departure profile is output as the final departure profile; otherwise, the adjusted departure profile is again adjusted. When the adjusted departure profile is not compliant, or if no adjustments are available or feasible, the dispatcher is notified. The dispatcher can then adjust the current conditions until a compliant departure profile is achieved. In some embodiments, the system may suggest adjustments to the current conditions (e.g., a lower takeoff weight) that will achieve a compliant departure profile.

Systems and methods in accordance with aspects of the present disclosure may be useable with any aircraft or fleet mix. An airport can use the system to determine noise, emissions, etc. generated for a fleet mix or determine fees (e.g., landing fees) if the airport makes a change such as adding a runway, re-designing its airspace, or changing its limits.

SPECIFIC EXAMPLES, MAJOR COMPONENTS, AND ALTERNATIVES

The following examples describe selected aspects of exemplary systems and methods for generating compliant aircraft departure profiles. These examples are intended for illustration and should not be interpreted as limiting the entire scope of the present disclosure. Each example may include one or more distinct inventions, and/or contextual or related information, function, and/or structure.

Example 1

This example describes an illustrative flight profile generation system 10; see FIG. 1.

In this example, flight profile generation system 10 includes a flight performance data generator 12 in communication with a compliance module 14. Flight performance data generator 12 may include any suitable hardware and/or software configured to generate three-dimensional data describing a flight path, and may be referred to as an airplane performance model or a flight performance model. This module may be provided by a manufacturer. For example, aircraft manufacturers typically provide and distribute flight performance models to airline customers. For example, the Boeing Climb-Out Program (BCOP) includes a graphical user interface and is configured to analyze, develop, and validate terminal area flight procedures. A flight performance model such as BCOP may base its generated data on Standard Instrument Departures (SID) and engine-out procedures.

Flight performance data generator 12 collects input data regarding conditions 16 (also referred to as current conditions and/or current condition inputs), such as airport temperature, elevation, runway information, initial aircraft take-off weight, departure track, flap retraction schedules, and the like. Additionally, flight performance data generator 12 may receive an input departure profile 18 corresponding to a desired departure profile. Profile 18 is evaluated along with conditions 16 to calculate expected airplane states as a function of time and distance during the departure. In other words, flight performance data generator 12 produces multi-dimensional data describing the expected state of the aircraft over time and/or distance, assuming profile 18 is carried out in light of conditions 16. Accordingly, flight performance data generator 12 may be configured to calculate departure performance data for an aircraft based on the desired departure profile and the current condition inputs. In other words, flight performance data generator 12 may be configured to calculate departure performance data for an aircraft based on current condition inputs and a given departure profile. Said another way, flight performance data generator 12 may be configured to generate flight performance data describing a flight path of a selected aircraft following the desired flight profile under the current ambient conditions.

Flight performance models such as BCOP were designed primarily to assist airlines in determining airplane engine-out performance during either departure or arrival operations. Here, flight performance generator 12 is used to generate outputs for a single departure of a specific aircraft, using current or expected conditions. In some examples, flight performance generator 12 includes software capable of interfacing with other modules, for example, through an application programming interface (API) or software development kit (SDK).

Compliance module 14 (also referred to as a comparison module) may include any suitable device or software configured to receive the output data from flight performance data generator 12, calculate one or more values based on the data, and compare the one or more values to one or more criteria. In other words, compliance module 14 is configured to compare one or more external criteria to at least one value corresponding to calculated departure performance data, and to provide a comparison output indicating a result of the comparison. Said another way, compliance module 14 is configured to determine a relationship between one or more external criteria and the performance data, and to communicate the relationship (e.g., provide an output corresponding to the relationship).

Accordingly, compliance module 14 receives criteria inputs 20, interchangeably referred to as external criteria and/or external criteria inputs. Criteria inputs 20 may include regarding noise abatement limits and the geographic location of one or more noise monitoring stations. Compliance module 14 calculates an expected noise emission from the aircraft as sensed at the noise monitoring station(s). Decibel levels may be determined as a function of time based on the flight performance data, on known aircraft noise performance, and the path of the aircraft relative to the noise monitoring station(s). Noise abatement limits may be stated with respect to peak noise levels and/or with respect to cumulative noise levels over time. Accordingly, noise levels may be simulated by compliance module 14 at each noise monitoring station over a range of time such that both instantaneous and cumulative levels can be determined.

Aircraft are typically certified for operations by regulatory authorities, such as the Federal Aviation Administration (FAA) and the European Aviation Safety Administration (EASA). One element of the certification process includes noise certification, and the aircraft is required to meet the regulatory noise requirement. Among other things, one of the deliverables from this noise certification is a table called the Noise-Power-Distance (NPD) map. The noise element in the NPD contains the generally accepted airport noise metric called "peak dBA" or "$L_{Amax}$." Peak dBA, for example, relates to the loudest decibel level recorded during a flyover, and is adjusted to how the human ear receives the sound.

The aircraft's distance from brake release, altitude, engine thrust, and latitude/longitude position (output from the flight performance data generator) are determined relative to the geographic position and elevation of the airport noise monitor(s). The aircraft's engine thrust (i.e., power) and the distance from the aircraft to the noise monitor may be used in a table look-up to retrieve the estimated noise level at the noise monitor from the NPD map.

Peak dBA or $L_{Amax}$ accounts for only the magnitude of a noise event. Therefore, some airports use a Single Event Noise Exposure Level (SENEL) or Sound Energy Level (SEL) metric that accounts for both the magnitude and the duration of the noise event. In these cases, multiple samples of NPD table look-ups are performed to develop a time history of dBA levels that represent the flight over the noise monitor.

Compliance module 14 performs a comparison between simulated emissions (e.g., noise) and the criteria at the selected locations, thereby determining a relationship. In other words, compliance module 14 compares the expected environmental emission of the aircraft to an emission abatement limit to determine a relationship therebetween. For example, the relationship may include an indication that the emissions violate the criteria. For example, the relationship may include an indication that the emissions meet the criteria. For example, the relationship may include an indication that the emissions meet the criteria by a certain margin, such as when noise levels are indicated at 75 dBA, a peak dBA noise limit is 80 dBA, and the resulting margin is 5 dBA. In some examples, emissions may be compared with multiple criteria, at multiple monitoring locations, and/or at multiple times or ranges of times. In some examples, criteria may change depending on time of day. In some examples, criteria may change based on distance from the airport.

The relationship(s) between the emissions and the criteria are provided by compliance module 14, such that a user may determine whether changes should be made to input profile 18. Changes may be necessary, for example, where one or more criteria are violated. Changes may be necessary or desired, for example, where the margin of compliance is greater than a selected margin. A minimum margin may be desired to ensure compliance while accounting for uncertainty of conditions, operational factors such as transition time between throttle or flap settings, and operator error. However, in some examples, a maximum margin may also be desired such that the aircraft is not experiencing an economic cost without the justification of complying with regulations.

In response to the relationship being communicated by compliance module 14, a user may change one or more aspects of the input departure profile such that emission (e.g., noise) levels are brought into the desired relationship. For example, if noise levels exceed a limit at a certain noise monitor, changes may be made to the departure profile to reduce the noise that will be sensed at that noise monitor. For example, this may include reducing thrust (or delaying an increase in thrust) and/or increasing altitude in the vicinity of the monitor.

The changed input profile may then be reprocessed by the system, determining whether the changed profile meets the criteria in a desired fashion. If the profile does meet the desired relationships, an output module may output to the user a final output profile 22, such as on a physical print-out, on a display screen, in a data file, and/or the like, or any combination of these. In an example situation where the original input file met all criteria in a desired manner, no changes may be needed, and input profile 18 may be substantially identical to output profile 22. In other examples, input profile 18 may be changed one or more times and reprocessed or iterated, such that output profile 22 is substantially different from the original input profile 18.

Figure 2:
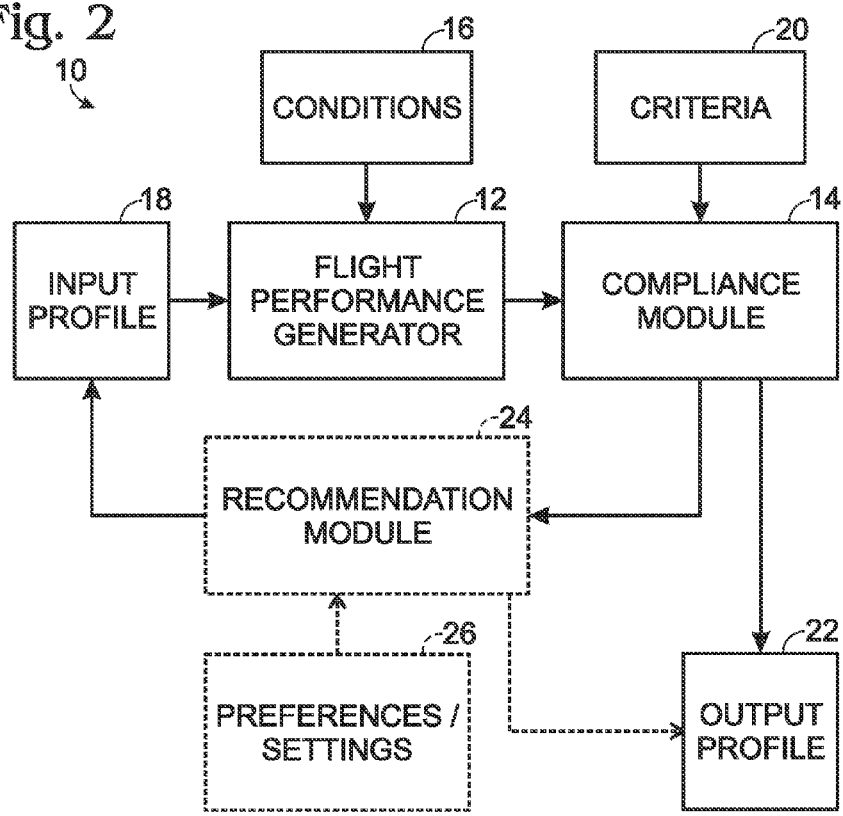
FIG. 2 is a schematic diagram of an illustrative system for generating aircraft departure profiles in accordance with aspects of the present disclosure.

Changing one or more aspects of input departure profile 18 may be assisted in part or performed entirely by a recommendation module 24, shown in FIG. 2 in dashed lines to indicate its optional nature in this Example. Recommendation module 24 may include any suitable hardware and/or software configured to determine and/or output one or more recommended changes that would bring input profile 18 into (or closer to) the desired relationship with criteria 20 (e.g., based on the comparison output from compliance module 14). For example, if simulated noise levels at a noise monitor are found to be in violation of a peak dBA limit, recommendation module 24 may determine that compliance is more likely if a throttle reduction is performed earlier in the departure profile. For example, throttle reduction may be scheduled to happen when the aircraft reaches 1,000 feet in altitude. If that condition occurs after the aircraft passes over the monitoring station, recommendation module 24 may determine that throttle reduction should happen at a lower altitude (e.g., 900 feet), i.e., before reaching the noise monitor.

Recommendation module 24 may include various instructions carried out by a data processing system (see Example 5 below). These instructions may include a logical decision trees, procedures, optimization routines, and/or the like, or any combination of these, as described in further detail in Examples 3 and 4. Recommendation module 24 may analyze the input profile in light of the relationship determined by compliance module 14, and make one or more recommendations based on user preferences 26. User preferences may include information regarding which aspects of the flight profile can be modified, what order to attempt modification, how much each modifiable aspect should be changed in each iteration, etc. Preferences 26 may also be referred to as settings, user settings, or configuration settings.

Recommendations may be provided by the recommendation module in any suitable form. For example, recommendation module 24 may provide a complete modified input profile for analysis. In other examples, module 24 may provide only recommended changes to the input profile. In some examples, the recommendation may be communicated directly to the flight performance data generator. In other examples, the recommendation may be presented to the user simultaneously or sequentially with respect to further processing. In some examples, the recommendation may be communicated exclusively to the user, such as in an advisory mode, for approval before further processing or as a recommended course of action for the user to pursue independently.

In some examples, recommendation module 24 may conclude that further modification is undesirable, impossible, or infeasible. This conclusion may be based on preferences 26. In these examples, output profile 22 may be provided from the recommendation module rather than passing again through the flight performance data generator and compliance module, as indicated in FIG. 2.

Example 2

This example describes an illustrative flight profile generation system 50, which is an embodiment of system 10; see FIGS. 3-9.

FIG. 3 is a block diagram of system 50, showing relationships between various components. In this Example, system 50 will be described regarding noise abatement limits. However, the system may be suitable for other emissions abatement situations. System 50 includes a flight performance data generator 52 in operative communication with a compliance module 54, and a recommendation module 56 in operative communication with both the compliance module and the flight performance data generator, such that the three modules are configured in a loop.

Flight performance data generator (FPDG) 52 is substantially similar to generator 12 of Example 1. FPDG 52 receives, as inputs, an input flight profile 58 and current conditions 60. Input flight profile 58 may include any suitable flight departure profile, including instructions for the departure phase of a flight such as flap settings and throttle management instructions, takeoff (TO) thrust, TO flaps, assumed temperature setting, standard instrument departure, and/or the like, or any combination of these. Current conditions 60 may include conditions and configurations having to do with the specific aircraft, airport, and departure being analyzed. For example, current conditions 60 may include one or more of the following aircraft-related conditions: aircraft type, engine model or type, TO weight. For example, current conditions 60 may include one or more of the following ambient weather-related conditions: temperature, wind speed, wind direction, runway condition. For example current conditions 60 may include one or more of the following airport-related conditions: airport layout, runway selected, track selected.

Having received input flight profile 58 and current conditions 60, and based on these inputs, FPDG 52 then generates flight parameter data 62 describing the aircraft departure. Data 62 may include information regarding multiple dimensions of the aircraft's departure such as altitude, speed, thrust, fuel consumption, time, and/or distance from brake release. An illustrative subset of flight parameter data 62 is shown in FIGS. 4-6, where aircraft altitude 64, thrust 66, and velocity 68 are each shown on an x-axis defined by distance 70 from brake release. Another illustrative subset of flight parameter data 62 (for a different flight profile) is shown in FIGS. 7-9, where aircraft altitude 64', thrust 66', and velocity 68' are shown on an x-axis defined by distance 70' from brake release. As explained further below, this information facilitates analysis with respect to known monitoring points along the departure track because the monitoring point will be at a known, specific distance from brake release.

Flight parameter data 62 is communicated to compliance module 54 for analysis. Compliance module 54 also receives inputs in the form of noise criteria 72. As described above, noise criteria 72 may include geographic locations and elevations of monitoring station(s), noise metrics, noise level limits, time-of-day-based rubrics, acceptable tolerance margin(s) established by an airline, and/or the like, or any combination of these. Compliance module 54 determines expected noise levels at each monitoring station (e.g., using the NPD map as described above), and compares the noise levels to the criteria. This comparison results in a relationship with respect to each monitoring station, wherein the noise levels at that monitor are in violation, or in compliance by some margin. If the noise levels are all in compliance by the acceptable tolerance margin established by the airline in question, then input flight departure profile 58 may be output as a final flight departure profile 74, which may be communicated by notifying a dispatcher 76 of the final profile.

If the noise levels do not have the desired relationship with the criteria, two possibilities may result, both of which may indicate modification of the flight departure profile is desirable. The first possibility is that one or more noise levels may be in violation of applicable noise limits. In these situations, compliance module 54 communicates the relationship, as well as the profile information and data regarding the monitoring station(s) in question, to recommendation module 56. Because a correction is required, modification of the flight departure profile is handled by a correction module 78 within recommendation module 56. Correction module 78 includes any suitable hardware and/or software configured to determine changes that can be made to the flight departure profile to bring it into compliance with the applicable limit(s). One embodiment of correction module 78 is described in further detail below (see Example 3).

Such changes will typically not be determined without additional guidance. Accordingly, a set of preferences 80 are provided to the recommendation module to indicate the user's priorities and preferred settings regarding flight departure profile modification. For example, these preferences may reflect airline business plan and/or economic priorities. For example, a given airline user may prioritize one or more of maximum payload, minimum noise, fuel efficiency, minimum time, minimum climb to cruise, and/or the like, or any combination of these. Likewise, certain adjustments and customizations of the flight departure profile may be forbidden, or may have selectable increments. For example, a user may prefer that payload be changed in 0.5% increments. In some examples, default settings may be established, and the user may override or modify one or more such settings. Accordingly, recommendation module 56 and correction module 78 are configured to align recommended changes with the user's priorities and choices.

The second possibility when noise levels and limits do not have the desired relationship is that the noise levels are excessively compliant. In other words, more margin exists than is economically desirable between the actual noise levels and the applicable noise abatement limits. In this situation, the user may wish to adjust the flight profile to take advantage of the margin available. Because this is an adjustment rather than a correction, and because the preferences and logic involved may be different from that in correction module 78, modification of the flight departure profile is handled by an adjustment module 82 within the recommendation module.

Adjustment module 82 includes any suitable hardware and/or software configured to determine changes that can be made to the flight departure profile to maintain compliance while reducing the margin of compliance. One embodiment of adjustment module 82 is described in detail below (see Example 4). In this regard, preferences 80 may include priorities regarding optimization of the flight departure profile, and may include a binary setting that effectively turns the adjustment module on and off. For example, some users may prefer not to adjust the profile once compliance is confirmed, regardless of margin. In other examples, this same effect may be substantially established by choosing a tolerance margin sufficiently large that no adjustment will ever be triggered.

Regardless of which sub-module determines how the flight profile should be modified, a modified version of input flight profile 58 may be communicated to FPDG 52 and the cycle will be repeated. This iteration loop may be repeated any number of times until the noise criteria and user preferences are satisfied, until it is determined that a solution is not feasible, or until a certain user-defined number of iterations have transpired.

Example 3

Figure 10:
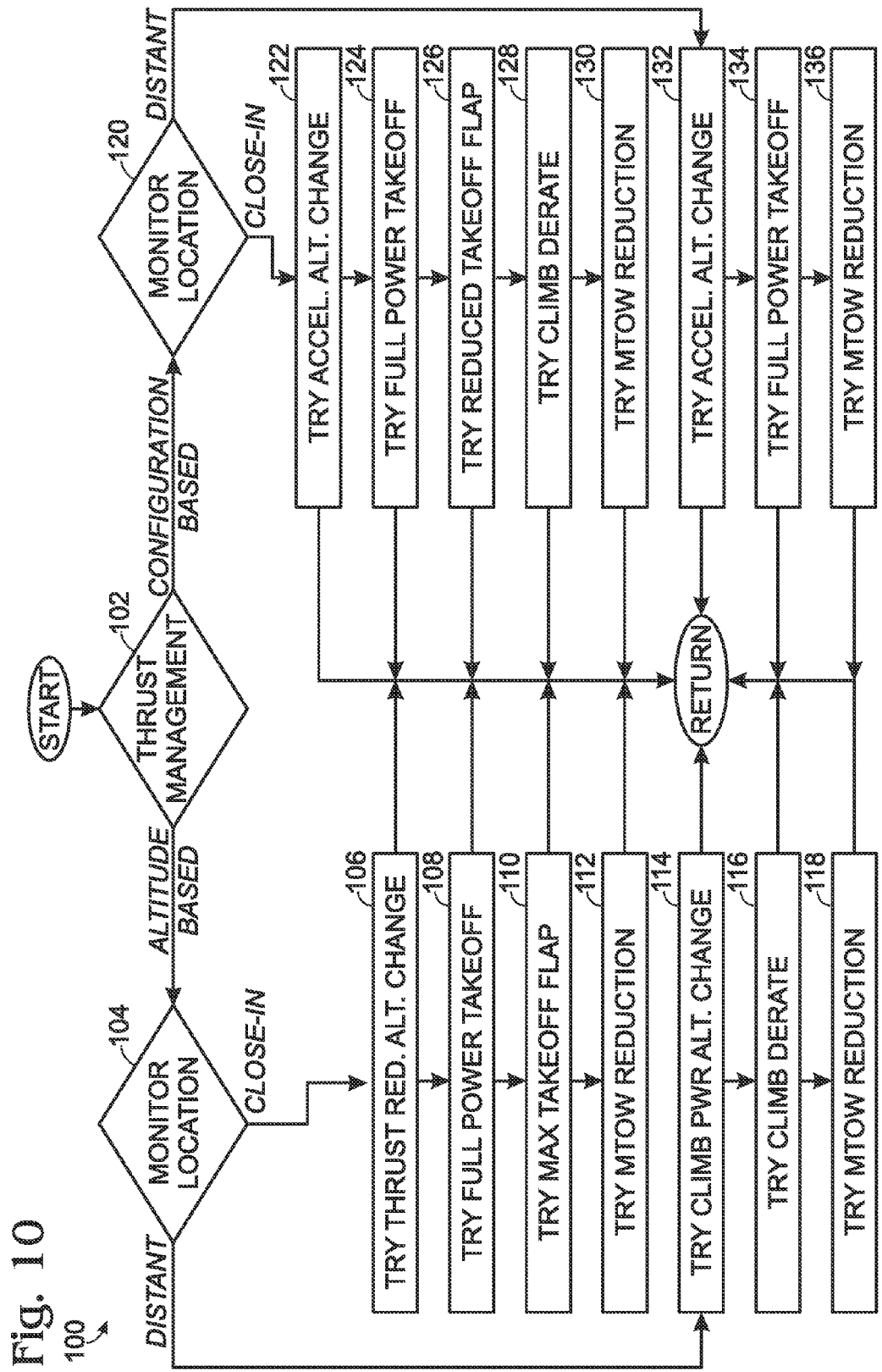
FIG. 10 is a block diagram illustrating another set of operations performed by one embodiment of a system for generating aircraft departure profiles in accordance with aspects of the present disclosure.

This example describes an illustrative correction module 100 suitable for use in a flight profile generation system in accordance with aspects of the present disclosure; see FIG. 10.

FIG. 10 is a flowchart illustrating steps performed by one embodiment of a correction module such as correction module 78, and may not recite the complete process or all steps of the program. FIG. 10 depicts multiple operations of a process which may be performed in conjunction with flight departure profile correction according to aspects of the present disclosure. Although various steps and operations are described below and depicted in FIG. 10, the steps need not necessarily all be performed, and in some cases may be performed in a different order than the order shown, depending for example on user preferences or priorities.

Module 100 may include several logic pathways, depending on factors such as the thrust management method being used in the flight profile and/or which noise monitoring locations have limit violations. These pathways may be traversed in any logical order. As shown in FIG. 10, a first decision point may include determining the thrust management method in step 102. Thrust management may be altitude-based (e.g., change thrust at a selected altitude) or aircraft configuration-based (e.g., change thrust at a selected flap setting).

Assuming first that thrust management is altitude-based, module 100 may proceed to a second decision point at step 104, wherein the noise monitor is classified as either a close-in (e.g., near) monitor or a distant monitor. Generally, a close-in monitor refers to monitors that are closer to the airport, falling within the initial takeoff zone and the initial thrust reduction area. A distant monitor falls farther from the airport than the close-in monitors, generally in the area around a thrust restoration and climb phase of departure. An illustrative position of a close-in monitor is indicated on FIGS. 4, 5, and 6, for example, at dashed line C. Likewise, an illustrative position of a distant monitor is indicated on FIGS. 7, 8, and 9 at dashed line D.

Assuming first that the monitor in question is a close-in monitor, module 100 carries out a series of possible changes to the flight departure profile in an attempt to reduce close-in noise. First, at step 106, thrust reduction altitude is changed. Referring back to the example of FIGS. 4-6, the departure profile indicates that thrust is reduced when altitude reaches 1,200 feet. This corresponds to approximately 18,000 feet from brake release. In this example, a noise monitor is at approximately 17,500 feet (as indicated by dashed line C). Accordingly, thrust reduction occurs after the aircraft passes the monitoring station. In step 106, module 100 would therefore suggest a change to reduce the thrust reduction altitude, for example to 1,000 feet. This action would cause thrust reduction to occur prior to the monitoring station, thereby reducing noise sensed there. After making this recommendation, control will return to the overall system and the modified flight profile will be reevaluated by the FPDG and compliance modules. If still in violation, module 100 will again be called and step 106 will be reached. At this point, the program may suggest a further change in thrust reduction altitude, or may determine that no further changes are feasible and/or desired.

Each of the steps described in this Example may be performed in a similar manner, such that the step is evaluated, an action is taken (if feasible), and the modification is re-checked. If control returns to that step, the action is taken again (if feasible) until compliance is reached, a selected number of iterations is performed, or repetition of the action is determined to be infeasible or inadvisable. At that point, the module proceeds to the next numbered step.

Assuming step 106 did not resolve the noncompliance, module 100 will check whether the flight departure profile prescribes a full-power takeoff. For example, engines are sometimes provided with an assumed temperature setting or derated to reduce engine wear. In both cases, this results in a lower-than-maximum power level. If the engines are found to have one of these conditions, step 108 will recommend a full-power takeoff to cause the aircraft to reach a higher altitude earlier, thereby causing the aircraft to reach the thrust reduction altitude sooner. This will cause the thrust level to drop before the aircraft reaches position C, thereby lowering the noise level.

Assuming step 108 (and any iterations thereof) is either non-applicable or failed to resolve the noncompliance, module 100 will determine whether the flight departure profile prescribes maximum takeoff flaps. If not, step 110 will recommend changing to maximum takeoff flaps, because this configuration causes a steeper ascent, again causing the aircraft to reach thrust reduction altitude sooner and reducing the noise level at close-in monitors.

Assuming step 110 (and any iterations thereof) is either non-applicable or failed to resolve the noncompliance, module 100 will proceed to step 112 and recommend a reduction in maximum takeoff weight (MTOW), also referred to as payload. Reduction of weight will result in a steeper takeoff at the same thrust level, so that the aircraft again will reach thrust reduction altitude sooner. Depending on the user settings and airline policies, a certain percentage of payload may be reduced at each iteration. Likewise, a certain maximum amount of acceptable payload reduction (also referred to as offload) may be established. Accordingly, step 112 may iterate at a certain percentage, such as 0.5% per iteration, and may stop when payload reaches a selected minimum level or maximum reduction amount. Additionally, so as not to overshoot the best payload level for compliance, step 112 may be repeated a final time with a small increase in payload (e.g., 0.25%) to establish that the proper level has been determined and recommended.

If step 112 and any applicable iterations are not successful, other aspects may be adjusted. In this example, however, it is assumed that no further aspects of the flight profile are available to affect noise levels at close-in monitors. Accordingly, if the profile is still in violation, module 100 will report that no feasible solution is possible. This information may allow the user to reevaluate settings and preferences to allow a solution. An indication of "no solution" will be similarly communicated at the termination of each series of steps described below.

Returning to step 104, if the monitor in question is a distant monitor, then step 114 will be performed. In step 114, thrust restoration altitude is adjusted. Typically, following a period of lower thrust, a climb phase is entered by restoring thrust, also known as climb power (see FIG. 8). For reasons similar to those regarding thrust reduction altitude, it may be desirable to raise the altitude at which thrust is restored and climb power is applied. This is because the additional thrust, with accompanying noise, would then be delayed until after the aircraft reaches the noise monitor (see line D of FIG. 8). In the example shown in FIGS. 7-9, thrust is restored at an altitude of 2,500 feet. This results in an increase in thrust (and noise) at approximately 20,000 feet from brake release, before reaching the monitoring station at D (approximately 23,000 feet from brake release). Accordingly, it would be advisable to restore thrust later, i.e., at a higher altitude.

Assuming step 114 (and any iterations thereof) is either infeasible or failed to resolve the noncompliance, module 100 will proceed to step 116. In step 116, module 100 will determine whether climb is derated. If not, module 100 will recommend derating climb power to cause the aircraft to reach thrust restoration altitude farther from brake release.

Assuming step 116 (and any iterations thereof) is either non-applicable or failed to resolve the noncompliance, module 100 will proceed to step 118. In step 118, a reduction in MTOW will be recommended. This step is substantially similar to step 112 described above. Reduction in MTOW would result in gaining altitude more quickly. Although this may cause the aircraft to reach thrust restoration altitude earlier (i.e., before the distant monitor), the aircraft may be significantly higher in altitude by the time the monitor is reached, thus reducing noise by way of vertical distance.

Returning to step 102, if it is determined that thrust management is configuration-based, module 100 will proceed to step 120 and categorize the monitor as in step 104. Assuming the monitor is a close-in monitor, execution will pass to step 122. In step 122, module 100 will attempt to reposition the acceleration altitude, thereby causing the aircraft to bring the nose down, reduce the throttle, and begin accelerating earlier. This in turn reduces noise at the monitor.

Assuming step 122 (and any iterations thereof) is either infeasible or failed to resolve the noncompliance, module 100 will proceed to step 124. In step 124, module 100 will recommend a full-power takeoff if not already prescribed. This step is substantially similar to step 108 above, with similar effects.

Assuming step 124 was unsuccessful, step 126 includes trying reduced takeoff flap settings if available. Reducing takeoff flaps results in reaching thrust reduction flap settings sooner. This is because of the shorter time required to retract flaps, which can result in reduced engine thrust (and corresponding noise) before reaching the monitor.

Assuming step 126 was unsuccessful or unavailable, step 128 includes recommending a derated climb setting if available. Using a derated climb setting reduces the thrust applied. Accordingly, noise associated with the thrust is lessened.

Assuming step 128 was unsuccessful or unavailable, step 130 includes reducing MTOW, which allows the aircraft to reach a higher altitude sooner, and is substantially similar to steps 112 and 118.

Returning to step 120, if the monitor in question is a distant monitor, module 100 will proceed to step 132. In step 132, module 100 will recommend changing acceleration altitude. This step is similar to step 122, but the recommendation will be in an opposite direction. Rather than accelerating earlier, step 132 will recommend accelerating later, i.e., at a higher altitude. This will cause the aircraft to reach a higher initial climb altitude, which in turn will cause the aircraft to be at a higher altitude and/or farther downrange when thrust is restored, thereby reducing noise at the monitor.

Assuming step 132 (and any iterations thereof) is unsuccessful or infeasible, step 134 includes recommending a full-power takeoff if not already prescribed. Again, this will cause the aircraft to reach a higher altitude before reducing power, therefore causing it to be at a higher altitude when thrust is restored.

Assuming step 134 is unsuccessful or infeasible, step 136 includes recommending a reduction in MTOW. This step is substantially similar to steps 112, 118, and 130.

Each of the steps described above may result in changes to the flight departure profile. In some examples, these changes may be cumulative. In some examples, one or more changes may be undone prior to applying others.

Example 4

Figure 11:
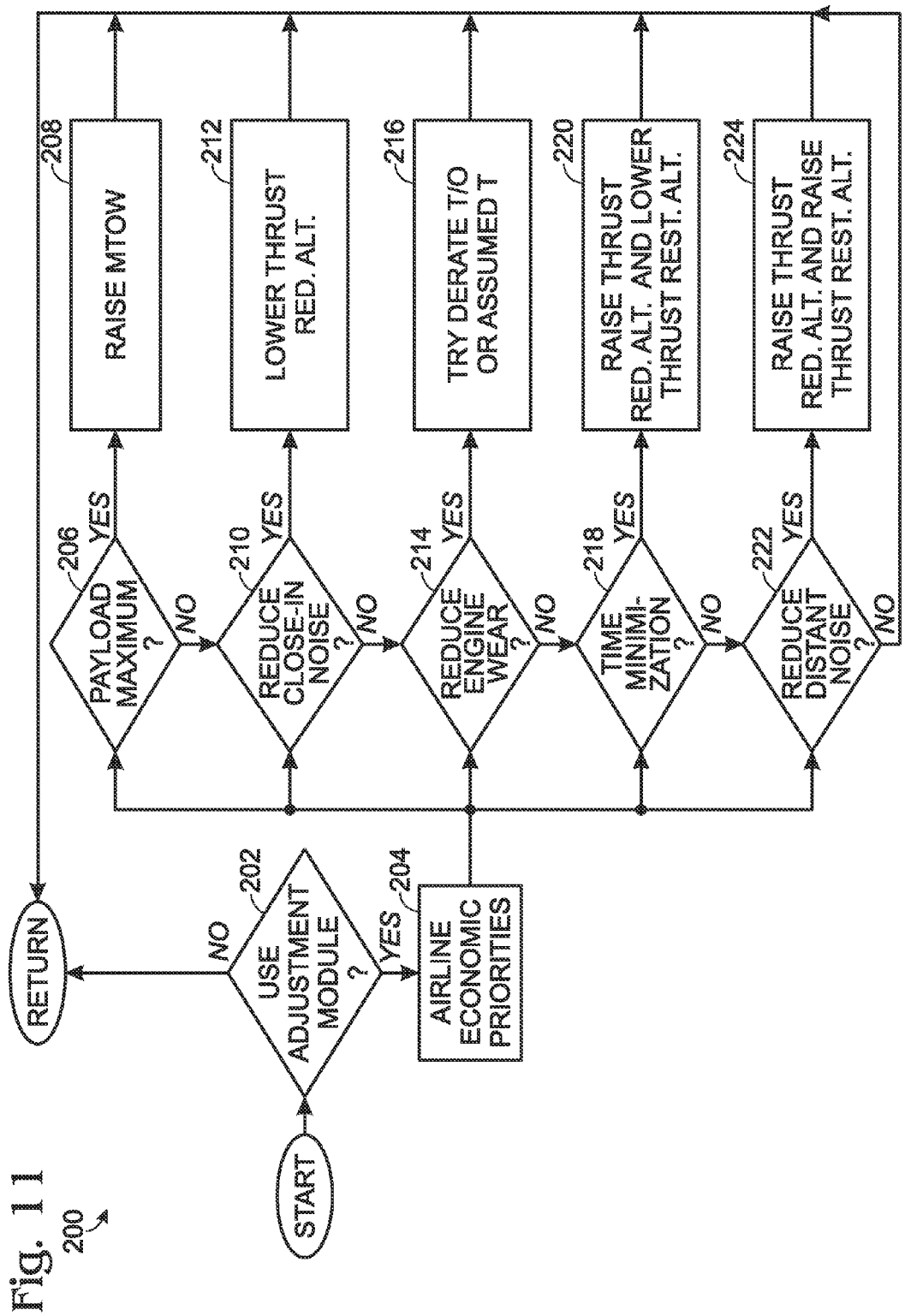
FIG. 11 is a block diagram illustrating another set of operations performed by one embodiment of a system for generating aircraft departure profiles in accordance with aspects of the present disclosure.

This example describes an illustrative adjustment module 200 suitable for use in a flight profile generation system in accordance with aspects of the present disclosure; see FIG. 11.

FIG. 11 is a flowchart illustrating steps performed by one embodiment of an adjustment module such as adjustment module 82, and may not recite the complete process or all steps of the program. FIG. 11 depicts multiple operations of a process which may be performed in conjunction with flight departure profile correction according to aspects of the present disclosure. Although various steps and operations are described below and depicted in FIG. 11, the steps need not necessarily all be performed, and in some cases may be performed in a different order than the order shown, depending for example on user preferences or priorities.

At step 202, module 200 checks whether the user has enabled the adjustment module. If not, execution returns to the overall system and optimization of margin is not performed. In general, optimization of the margin includes increasing noise levels at a close-in or distant monitor, depending on where excessive compliance exists. Increasing noise levels may be accomplished by one or more of the following steps, among others.

At step 204, settings and/or preferences having to do with the airline user's economic priorities are checked to determine which aspects of the flight departure profile should be adjusted to take advantage of the margin, and in which order. The following steps are described in a certain order, but certain steps may be performed in a different order or not at all, depending on user preferences.

In step 206, module 200 determines whether maximizing payload is a goal. If so, step 208 includes raising the MTOW. This operation is similar to MTOW reductions described in Example 3, but adding weight rather than removing it. Similar iterations may be performed until a desired margin is reached. Alternatively, other modifications may be made in tandem with MTOW increase.

At step 210, module 200 determines whether reducing close-in noise is a goal. This may be the case, for example, if margin exists with respect to a distant monitor. If so, step 212 includes reducing the thrust reduction altitude to drop the noise level at the close-in monitor(s). This change may increase noise at distant monitors, because the aircraft will be lower when it reaches the distant monitors.

At step 214, module 200 determines whether reducing engine wear should be a goal. If so, step 216 includes recommending a derated takeoff or assumed temperature setting. Both of these results in lower engine power, therefore resulting in a slower climb to thrust reduction altitude. Accordingly, thrust reduction will occur farther downrange, resulting in a higher noise level at close-in monitors.

At step 218, module 200 determines whether reducing time should be a goal. If so, step 220 includes recommending raising the thrust reduction altitude and lowering the thrust restoration altitude. These actions will result in the aircraft reaching cruise altitude in the shortest possible time, as the aircraft will be in a higher-thrust, faster-climb state for a greater portion of the departure (e.g., remaining in the initial takeoff phase longer and starting the final climb phase earlier). In other words, the aircraft will spend less time in the acceleration phase, during which elevation gain is reduced. Accordingly, final elevation will be reached more quickly.

At step 222, module 200 determines whether reducing distant noise should be a goal. For example, margin may exist at close-in monitors. If so, step 224 includes raising the thrust reduction altitude and also raising the thrust restoration altitude. These actions will result in an increase in noise at close-in monitor(s), but will also cause the aircraft to gain a higher elevation before the shallower ascent of the acceleration phase. In addition to the higher altitude, thrust restoration is also delayed until farther downrange, presumably beyond the distant monitor(s).

Example 5

This example describes a data processing system 900 in accordance with aspects of the present disclosure. In this example, data processing system 900 is an illustrative data processing system suitable for implementing flight profile generator systems and methods as described in the examples above; See FIG. 12.

In this illustrative example, data processing system 900 includes communications framework 902. Communications framework 902 provides communications between processor unit 904, memory 906, persistent storage 908, communications unit 910, input/output (I/O) unit 912, and display 914. Memory 906, persistent storage 908, communications unit 910, input/output (I/O) unit 912, and display 914 are examples of resources accessible by processor unit 904 via communications framework 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis.

Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 12 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in communications framework 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 6

This section describes additional aspects and features of departure profile generation systems and methods, presented without limitation as a series of numbered paragraphs. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A system comprising a flight performance data generator configured to receive current condition inputs and a desired departure profile, the flight performance data generator further configured to calculate departure performance data for an aircraft based on the desired departure profile and the current condition inputs; and a comparison module configured to receive one or more external criteria, to compare the one or more external criteria to at least one value corresponding to the calculated departure performance data, and to provide a comparison output indicating a result of the comparison.

A1. The system of A0, further comprising a recommendation module configured to output one or more recommended changes to the desired departure profile based on the comparison output.

A2. The system of A0, further comprising an output module configured to respond to the comparison output by outputting a recommended departure profile meeting the one or more external criteria.

A3. The system of A0, wherein the current condition inputs include one or more inputs corresponding to current weather conditions at a selected airport.

A4. The system of A0, wherein the current condition inputs include one or more inputs corresponding to a configuration of the aircraft.

A5. The system of A0, wherein the external criteria include one or more criteria corresponding to noise limits at noise monitoring locations.

B0. A computer system for generating a departure profile for an aircraft, the computer system comprising a processor; a one or more storage devices; and a departure profile generating program including a plurality of instructions stored in the one or more storage devices that are executed by the processor to: receive current condition inputs and a first departure profile; calculate first departure performance data for an aircraft based on the current condition inputs and the first departure profile; determine a first relationship between one or more external criteria and the first departure performance data; and provide an output corresponding to the first relationship.

B1. The system of B0, wherein the one or more external criteria include a noise abatement limit.

B2. The system of B1, the plurality of instructions being further executed by the processor to: in response to the first relationship being substantially different than a desired relationship, modify the first departure profile to create a second departure profile having second departure performance data that meets the desired relationship.

B3. The system of B2, the processor further executing instructions to output the second departure profile.

B4. The system of B1, wherein determining the first relationship includes calculating a value corresponding to the data and comparing the value to the one or more criteria.

B5. The system of B4, wherein the desired relationship includes the value meeting the one or more criteria.

B6. The system of B5, wherein the desired relationship includes the value meeting the one or more criteria by no more than a selected margin.

C0. A method for generating a flight departure profile that is compliant with an emission limit at a monitoring location, the method including: receiving a desired flight departure profile and one or more current ambient conditions; generating flight performance data describing a flight path of a selected aircraft following the desired flight departure profile under the current ambient conditions; determining an expected environmental emission of the aircraft as sensed at a selected monitoring location; comparing the expected environmental emission of the aircraft to an emission abatement limit to determine a relationship therebetween; and communicating the relationship.

C1. The method of C0, wherein communicating the relationship includes communicating the relationship to a user.

C2. The method of C0, wherein the emission is noise and the emission abatement limit is a noise abatement limit.

C3. The method of C0, further including modifying the desired flight departure profile in response to the relationship between the expected environmental emission and the emission abatement limit.

C4. The method of C3, wherein modifying the desired flight departure profile includes selecting one or more modifiable aspects of the profile based on user preferences.

C5. The method of C3, wherein modifying the desired flight departure profile includes modifying the flight departure profile in response to the environmental emission being in compliance with the emission abatement limit by more than a selected margin.

C6. The method of C0, wherein the generating, determining, comparing, and communicating steps are performed for a specific aircraft departure using current ambient conditions including a current wind condition and a current temperature.

D0. The system or method of any other paragraph, wherein the current ambient conditions include a selected runway at a selected airport.

E0. The system or method of any other paragraph, wherein the current condition inputs include one or more of an aircraft model, a takeoff weight, an engine type, an engine thrust rating, a flap setting, a weather condition, a runway information, and a departure track.

F0. The system of method of any other paragraph, wherein external criteria include a monitoring location and/or noise level limits.

G0. The system or method of any other paragraph, wherein generated departure parameters include a desired departure profile, aircraft altitude(s), aircraft speed(s), engine thrust, fuel usage, and/or time after beginning departure.

H0. The system or method of any other paragraph, wherein the compliance unit compares a noise level in calculated departure parameters with a noise level restriction of a selected airport.

J0. The system of any other paragraph, further comprising a departure profile unit configured to calculate an adjusted departure profile if the noise associated with the calculated departure parameters does not meet the external noise criteria.

J1. The system, of J0, wherein the departure profile unit is configured to calculate an engine thrust reduction location, a climb power setting, a fuel efficiency, and/or a time from the beginning of departure.

J2. The system of J0, further comprising a compliance unit configured to compare the adjusted departure profile to a compliance criteria; wherein the adjusted departure profile is output as the final departure profile when the adjusted departure profile meets the compliance criteria and the external noise criteria.

J3. The system of J0, further comprising a solution device configured to provide possible adjustments to the current conditions that will result in an adjusted departure profile that meets the compliance criteria.

K0. A system that uses current conditions to generate a departure profile that is, or is close to, a desired departure profile without violating airport criteria.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A system for controlling departure of an aircraft from a runway, the system comprising:
   a profile generator configured to generate a final departure profile for the aircraft based at least in part on one or more emissions criteria at an emissions monitoring station disposed along a selected departure track of an airport, the profile generator including:
   a flight performance data generator configured to receive current condition inputs and an initial departure profile associated with the aircraft, and to calculate departure performance data for the aircraft based on the initial departure profile, the selected departure track, and the current condition inputs, the departure performance data including a projected altitude of the aircraft versus a distance along the departure track;
   a comparison module configured to receive the one or more emissions criteria, to compare the one or more emissions criteria to one or more emissions of the aircraft corresponding to the calculated departure performance data for the aircraft, and to provide a comparison output indicating a result of the comparison; and
   a recommendation module configured to receive the comparison output and, in response to the one or more emissions being substantially different than the one or more emissions criteria, to generate a final departure profile for the aircraft, the final departure profile being usable to control the aircraft along a flight path corresponding to the modified departure profile without exceeding the one or more emissions criteria at the monitoring station;
   wherein the final departure profile is stored electronically onboard the aircraft, and a control system of the aircraft is configured to control components of the aircraft to follow the final departure profile when the aircraft departs from the runway; and
   wherein generating the final departure profile includes changing a maximum takeoff weight of the aircraft.

2. The system of claim 1, wherein the current condition inputs include one or more inputs corresponding to current weather conditions at a selected airport.

3. The system of claim 1, wherein the current condition inputs include one or more inputs corresponding to a configuration of the aircraft.

4. The system of claim 1, wherein the one or more emissions criteria include a noise abatement limit and the emissions monitoring station is a noise monitoring station.

5. A computer system for generating a departure profile for an aircraft departing from a runway, the computer system comprising:
   a processor;
   one or more storage devices; and
   a departure profile generating program including a plurality of instructions stored in the one or more storage devices that are executed by the processor to:
   receive current condition inputs and a first departure profile associated with the aircraft that is undeparted from the runway;
   calculate departure performance data for the aircraft based on the current condition inputs, a selected departure track, and the first departure profile, the first departure performance data including an altitude of the aircraft versus a distance along the departure track;
   compare one or more emissions criteria at an emissions monitoring station to one or more emissions of the aircraft corresponding to the calculated departure performance data for the aircraft; and
   in response to the one or more emissions being substantially different than the one or more emissions criteria, generate a second departure profile for the aircraft, the second departure profile being usable to control the aircraft along a flight path corresponding to the second departure profile without exceeding the one or more emissions criteria at the emissions monitoring station;

wherein the second departure profile is stored electronically onboard the aircraft, and a control system of the aircraft is configured to control components of the aircraft to follow the second departure profile when the aircraft departs from the runway; and wherein the second departure profile includes modifying a takeoff weight of the aircraft that is undeparted from the runway.

6. The system of claim 5, wherein the one or more emissions criteria include a noise abatement limit.

7. The system of claim 5, the plurality of instructions being further executed by the processor to: communicate the second departure profile to the aircraft as a data file.

8. The system of claim 7, the processor further executing instructions to output the second departure profile.

9. The system of claim 5, wherein the second departure profile results in the one or more emissions meeting the one or more emissions criteria.

10. The system of claim 5, wherein the second departure profile results in the one or more emissions meeting the one or more emissions criteria by no more than a selected margin.

11. The system of claim 1, wherein the final departure profile is generated based on a modified configuration of the aircraft.

* * * * *